US010139088B2

(12) United States Patent
Watkins

(10) Patent No.: US 10,139,088 B2
(45) Date of Patent: Nov. 27, 2018

(54) ENHANCED FIXTURE IN GRID OF FIRST VOLTAGE WITH STEP-DOWN POWER SUPPLY FOR ENERGIZING ANCILLARY DEVICE REQUIRING SECOND VOLTAGE

(71) Applicant: John Michael Watkins, Claremont, CA (US)

(72) Inventor: John Michael Watkins, Claremont, CA (US)

( * ) Notice: Subject to any disclaimer, the term of this patent is extended or adjusted under 35 U.S.C. 154(b) by 78 days.

(21) Appl. No.: 15/489,378

(22) Filed: Apr. 17, 2017

(65) Prior Publication Data

US 2017/0314772 A1 Nov. 2, 2017

Related U.S. Application Data

(60) Provisional application No. 62/323,406, filed on Apr. 15, 2016.

(51) Int. Cl.

| | |
|---|---|
| ***F21V 23/06*** | (2006.01) |
| ***F21V 23/00*** | (2015.01) |
| ***H04N 5/225*** | (2006.01) |
| *H04W 88/08* | (2009.01) |
| *F21S 2/00* | (2016.01) |
| *F21W 131/40* | (2006.01) |
| *F21Y 115/10* | (2016.01) |

(52) U.S. Cl.

CPC ............ *F21V 23/001* (2013.01); *F21V 23/06* (2013.01); *H04N 5/2256* (2013.01); *F21S 2/00* (2013.01); *F21W 2131/40* (2013.01); *F21Y 2115/10* (2016.08); *H04W 88/08* (2013.01)

(58) Field of Classification Search

CPC ........ F21V 23/001; F21V 23/06; F21V 21/02; F21V 21/03; F21V 23/002; F21V 23/02; H04N 5/2256; F21Y 2115/10; F21S 2/00; F21W 2131/40; F21W 2131/407; F21W 2131/402; H04W 88/08

See application file for complete search history.

(56) References Cited

U.S. PATENT DOCUMENTS 4,047,336 A * 9/1977 Stahlhut .................... E04B 9/10 52/28

5,640,069 A * 6/1997 Nilssen ............. H02M 7/53832 315/209 R

2016/0116125 A1* 4/2016 Lydecker .................. F21S 2/00 362/95

* cited by examiner

*Primary Examiner* — Bao Q Truong

(74) *Attorney, Agent, or Firm* — Myers Andras LLP; Joseph C. Andras

(57) ABSTRACT

An enhanced array of light fixtures for providing both light and a desired non-light feature within an illuminated area of a structure. The enhanced array is formed from a first plurality of light fixtures that are adapted for emitting light and a reduced plurality of enhanced light fixtures comprised of a subset of the first plurality of light fixtures that are adapted for emitting light and also for supporting a corresponding plurality of auxiliary non-light-emitting devices that require a different voltage and are adapted for providing a desired non-light feature within the illuminated area of the structure.

5 Claims, 6 Drawing Sheets

Commercial AC Power
277v/480v
30 40 50
21
120
121
190
21
21
121
190
31 41 51

Commercial AC Power
277v/480v
30 40 50
120
21
121
190
31 41 51

ENHANCED FIXTURE IN GRID OF FIRST VOLTAGE WITH STEP-DOWN POWER SUPPLY FOR ENERGIZING ANCILLARY DEVICE REQUIRING SECOND VOLTAGE

BACKGROUND

Field of the Invention

The present invention relates generally to lighting, fans, or similar fixtures and, more particularly, to an enhanced fixture in a symmetric grid of first voltage with provisions for supplying a second voltage to an ancillary device that is located in or near the fixture.

Description of the Related Art

FIG. 1 shows a facility 10 having an array 20 of fixtures 21 (here light fixtures) that are powered by power lines (not shown) that are distributed from fixture to fixture in a generally symmetric grid. The illustrated facility 10 is a warehouse, but similar systems are employed in retails stores, parking garages, etc.

FIG. 2 is a closer view of a single lighting fixture 21. This particular fixture 21 is an "LEHB Series" High Bay fixture sold by FSC Lighting (www.fsclighting.com). It is designed for a variety of mounting heights and to work on a commercial AC power grid. Other fixtures commonly operate on a commercial voltage of 480 v. The common commercial voltages are 277v or 480 v because these two voltages can be derived from two wires in a five-wire three-phase 277/480 volt panel. The five wires are Phase A, Phase B, Phase C, Neutral, and Earth Ground. A voltage of 277 v is provided between any one phase and the neutral and a voltage of 480v is provided between any two phases.

FIG. 3 is a simplified schematic diagram of the array 20 of standard fixtures 21, as viewed from below. The dashed lines are suggestive that the grid may be quite large.

FIG. 4 illustrates how AC power might be distributed from fixture 21 to fixture 21 in the array of FIG. 3, still as viewed from below. The figure shows three bus lines 30, 40, 50 and a plurality of parallel feed lines 31, 41, 51. In the illustrated embodiment, bus lines 30, 40 are power lines (e.g. one phase and neutral), and bus line 50 is an earth ground. The parallel feed lines 31, 41, 51 extend the AC power and safety ground from the bus lines 30, 40, 50 to the fixtures, jumping from fixture 21 to fixture 21 in parallel rows. The illustrated distribution topology is simplified and exemplary. The exact configuration of the wiring grid may vary per local code requirements, designer preference, etc. What should be understood from the illustrations is that a commercial facility 10 often has a gridded system of commercial power (277 v or 480 v) that is distributed to an array 20 of fixtures 21.

Facility owners sometimes need to locate ancillary devices throughout the facility 10. These ancillary devices that an owner requires include WiFi access points, RFID transponders, etc. Sometimes it is only necessary to deploy only a few such devices, so one would not normally install a grid of necessary voltage lines in advance and it is generally necessary to hard-wire direct runs of the required power to each ancillary device at great expense.

A problem exists, therefore, in that the facility owner must often run separate single-phase power (e.g. 120 v or 240 v) to the ancillary devices, after the desired locations are known, either because they require such conventional AC power, or because they use an AC adapter that only accepts a narrow range of residential-level input voltages, e.g. 100-240 VAC, that lie below 277 v or 480 v.

SUMMARY OF THE INVENTION

In a first embodiment, the invention comprises an enhanced array of light fixtures for providing both light and a desired non-light feature within an illuminated area of a structure, comprising a first plurality of light fixtures that are adapted for emitting light and a reduced plurality of enhanced light fixtures comprised of a subset of the first plurality of light fixtures which are adapted for emitting light and also for supporting a corresponding plurality of auxiliary non-light-emitting devices that require a different voltage and are adapted for providing a desired non-light feature within the illuminated area of the structure. In operation, a grid of wires connected to each of the light fixtures in the first plurality of light fixtures, said grid of wires providing commercially available power having a first line voltage to each of the light fixtures.

The first plurality light fixtures are comprised of a light emitting system that is connected to and receives the commercially available power having the first line voltage, the light emitting system thereby emitting light to provide light within the illuminated area of the structure. The second plurality of light fixtures, however, are each further comprised of a power conversion unit that is also connected to and receives the commercially available power having the first line voltage, the power conversion unit converting the first line voltage to a second lower voltage and providing it to the non-light-emitting devices supported by the light fixture.

In a preferred embodiment, the enhanced array of light fixtures of claim 1 wherein the first line voltage is 277 volts and the second lower voltage is 120 volts.

The non-light-emitting devices that may be used are many including, but not limited to, a camera, a WiFi access point, and an RFID transponder.

DETAILED DESCRIPTION OF THE PREFERRED EMBODIMENTS

In order to resolve the above problems, I have developed a lighting fixture or a high volume ceiling fan that accepts one voltage into it to operate the light fixture and ALSO provides an outbound power source of another voltage to operate equipment that cannot operate at the inbound voltage to the luminaire.

Figure 5:
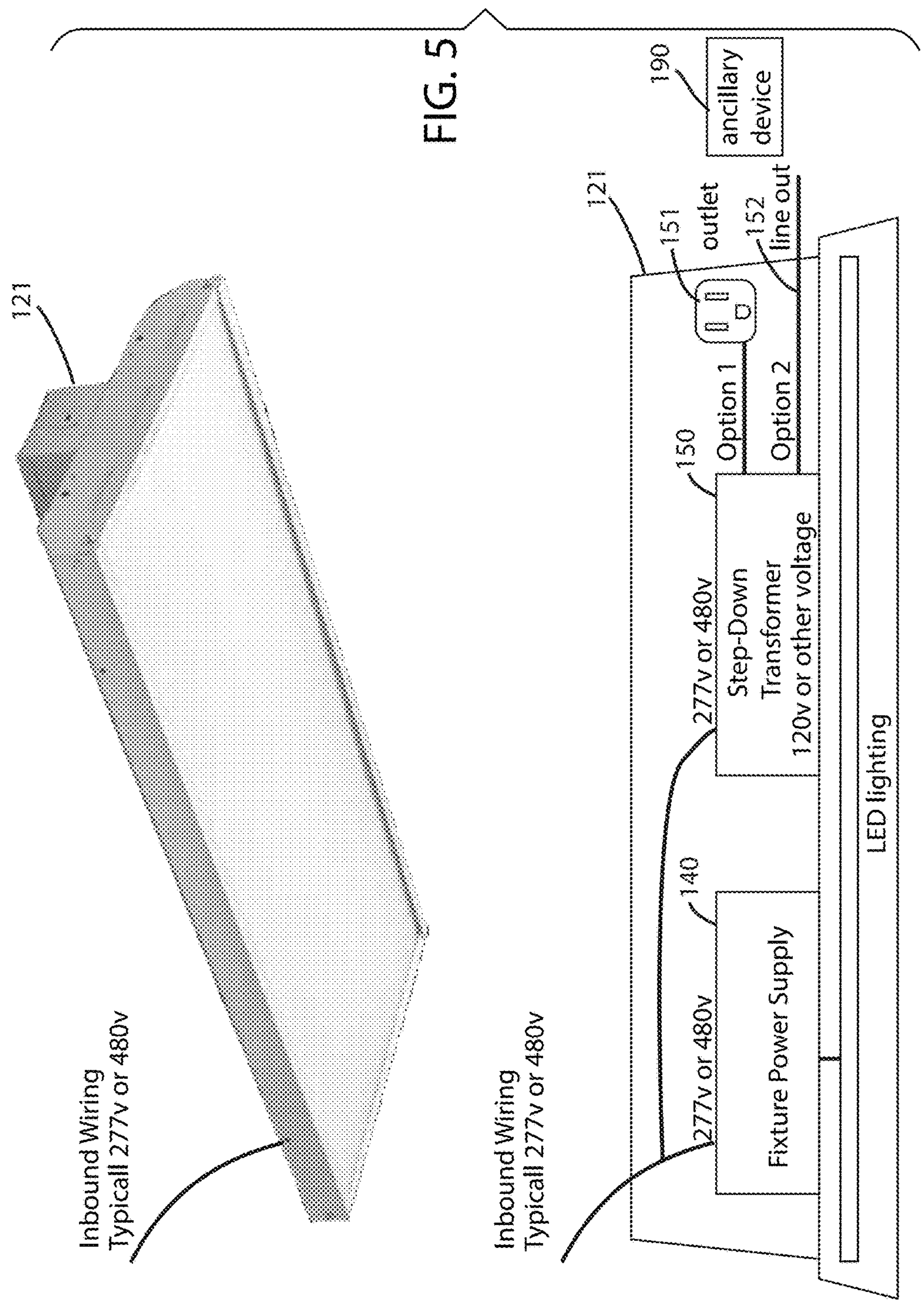
FIG. 5 shows an enhanced light fixture 121 used in an array 120 of standard light fixtures 21 according to a first preferred embodiment of the invention.

FIG. 5 shows an enhanced light fixture 121 used in an array 120 of standard light fixtures 21 according to a first preferred embodiment of the invention. As shown, the electrical power to the lighting system in a parking garage could be 277 volts. The lighting fixture, in this instance would accept the 277 volt power to operate. The power entering the enhanced fixture 121 would be split off in two directions. The first split would be to operate the lighting fixture itself via the fixture's power supply 140. The second split would be to go to a power conversion unit 150 (e.g. step down transformer used alone, or in combination with other components) in order to drop the voltage down to another voltage (typically 120 v) to conveniently operate another component such as a power adapter for a wireless device or a camera.

Figure 1:
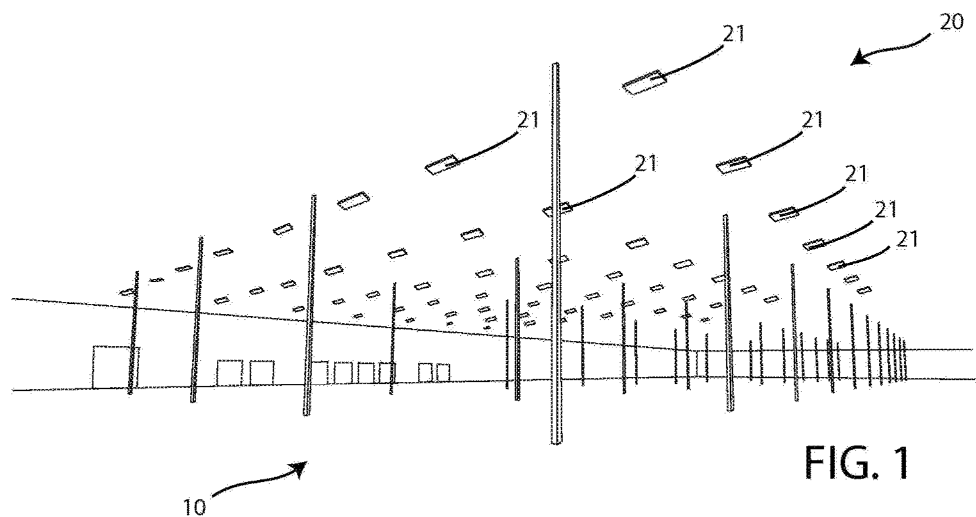
FIG. 1 shows a facility 10 having an array 20 of fixtures 21 (here light fixtures) that are powered by power lines (not shown) that are distributed from fixture to fixture in a generally symmetric grid.
Figure 2:
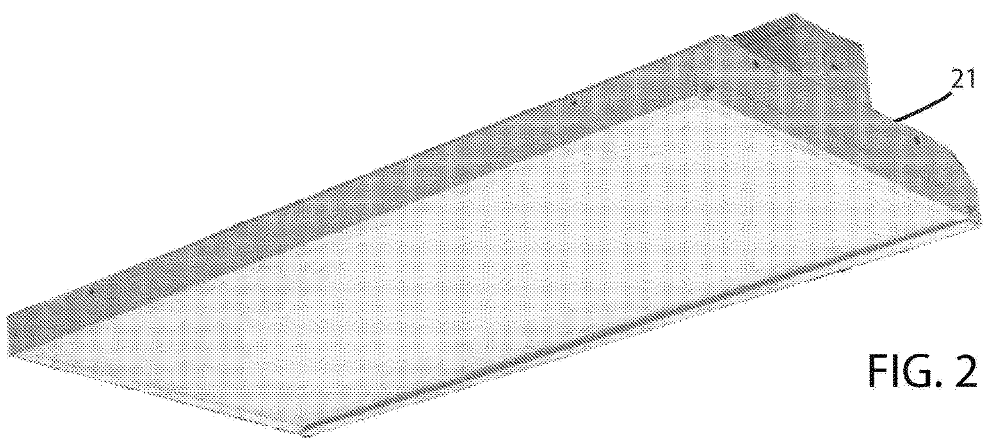
FIG. 2 is a closer view of a single lighting fixture 21.
Figure 3:
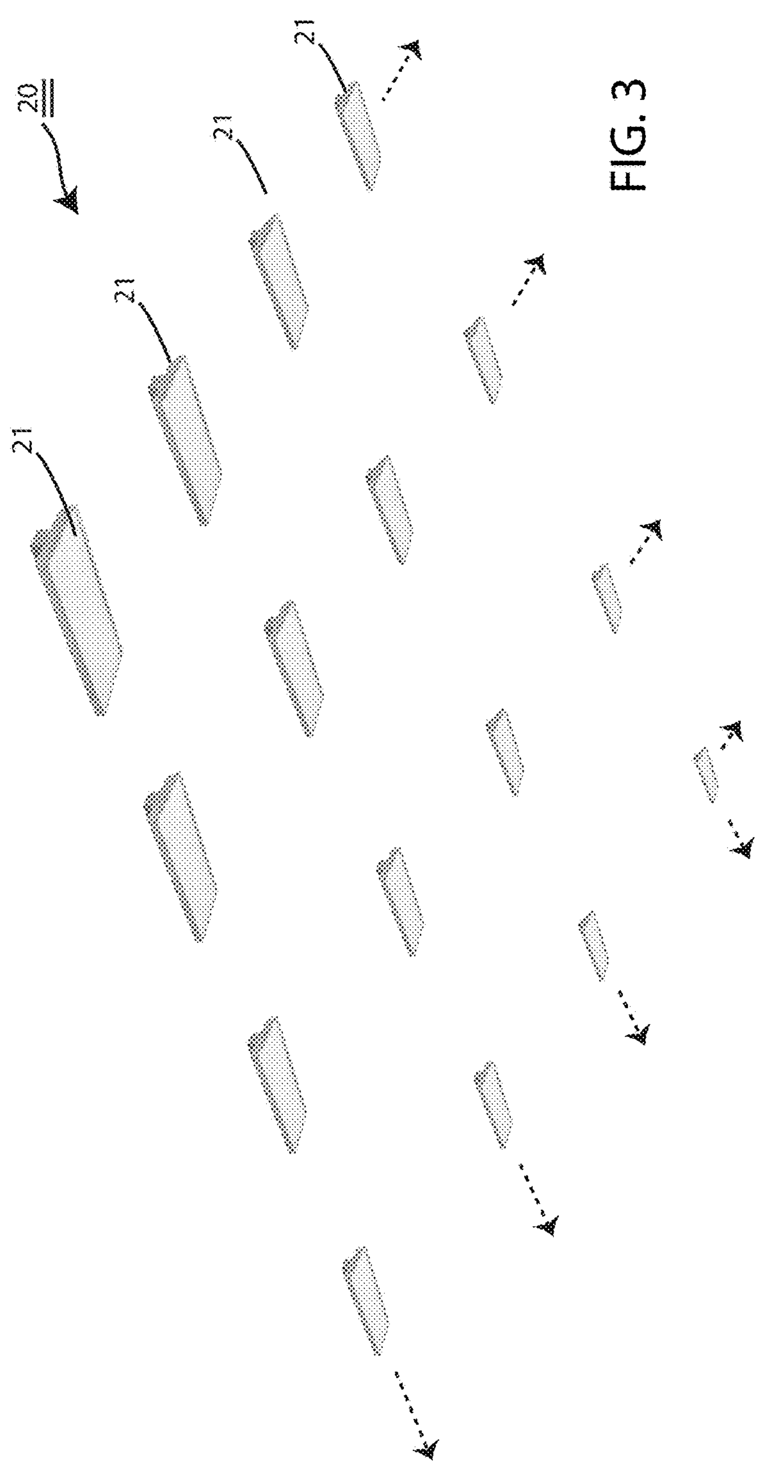
FIG. 3 is a simplified schematic diagram of the array 20 of standard fixtures 21, as viewed from below.
Figure 4:
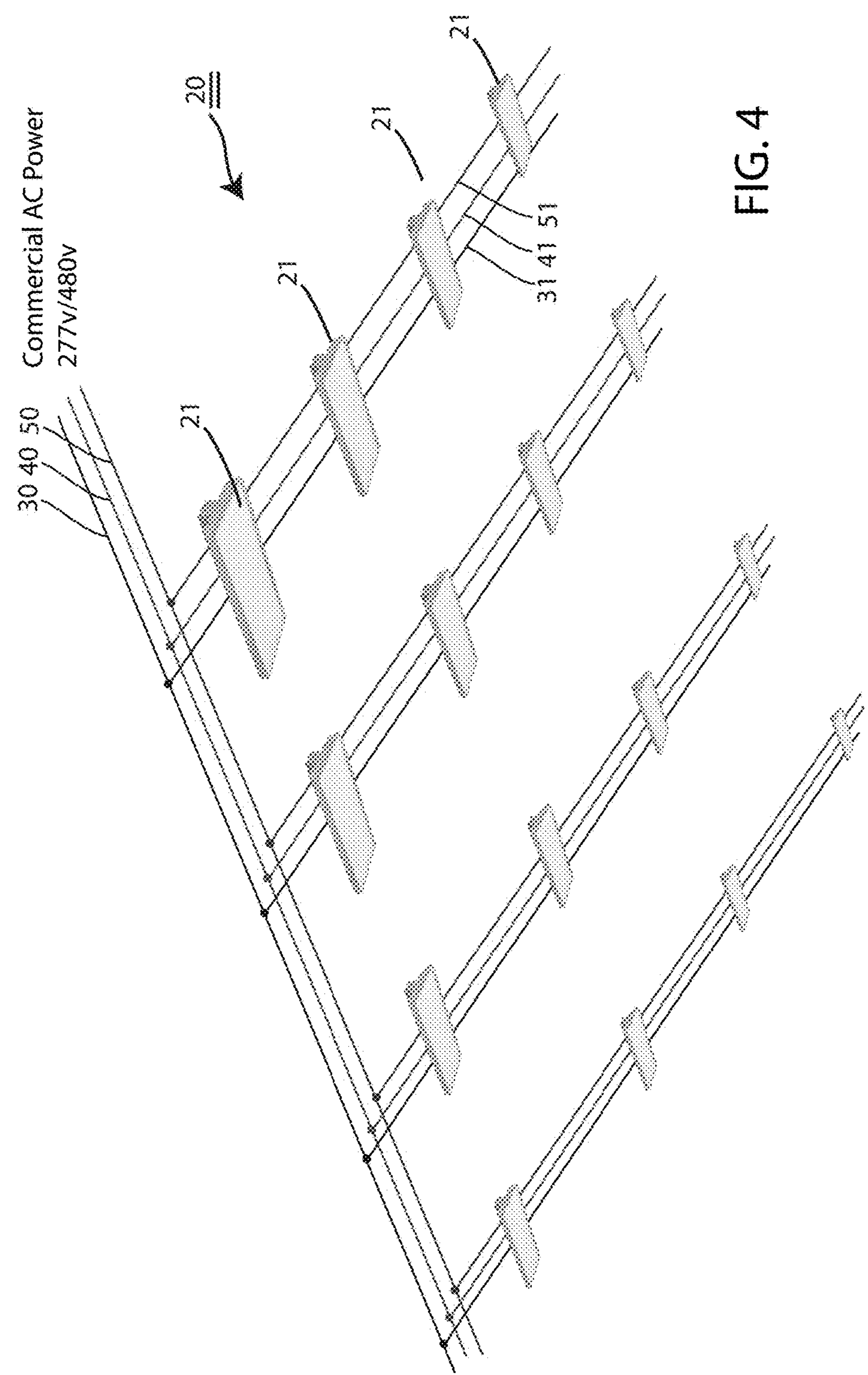
FIG. 4 illustrates how AC power might be distributed from fixture 21 to fixture 21 in the array of FIG. 3, still as viewed from below.
Figure 6:
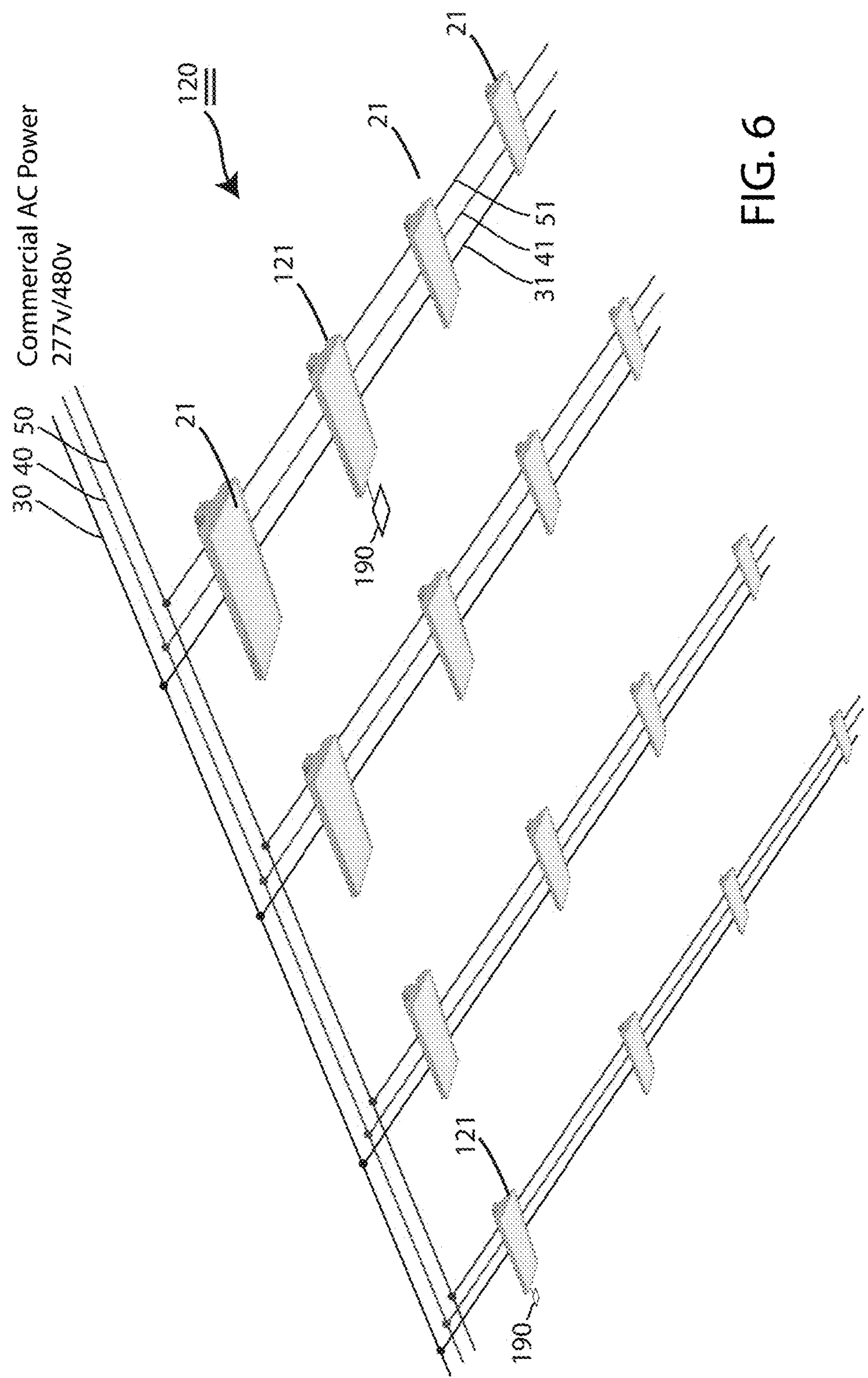
FIG. 6 shows an enhanced array 120 that is comparable to FIG. 4, but formed from standard light fixtures 21 and one or more enhanced fixtures 121.

FIG. 6 shows an enhanced array 120 that is comparable to FIG. 4, but formed from standard light fixtures 21 and one or more enhanced fixtures 121. In this particular case, two of the standard fixtures 21 have been replaced by enhanced fixtures 121 that provide convenient power for two related ancillary devices 190 which, if they input or output data (e.g. WiFi access points, RFID transponders, video cameras, etc.), would ideally send or receive data wirelessly. As a result, the ancillary devices 190 can be most anything that would otherwise require expensive, direct, point-to-point wiring for power, or data, or both.

Referring back to FIG. 5, the power conversion unit 150 can feed a convenience outlet 151 for receiving a standard plug (e.g. 120 v), or can be provided on a "line out" 152 (at 120 v or any other desired voltage, AC or DC). The reason why this is important is that in the parking garage application, the most symmetrical electrical grid that is accessible without running ancillary power is the lighting system itself, but most of the parking garages operate at voltages much higher than third party devices like cameras and wireless gateways.

Another commercial application would be in a warehouse. Most distribution centers (not manufacturing plants) have very few electrical plugs installed at 120 v and certainly none high in the ceiling. These applications are usually 277 v or 480 v to the lighting fixtures. As more wireless data is needed and being used in distribution centers, the cost of wiring "Power-Over-Ethernet" or POE gateways/transceivers or hard wired transceivers to get wireless to where they need it is very expensive. By providing the required power from an enhanced fixture 121 using a step down transformer 150 (possibly to 120 v) we can eliminate the costly "home-run" wiring needed to power these ancillary devices.

The same is true for devices that need to operate at higher voltage than the building voltage. Instead of a step down transformer we can pre-wire a buck boost transformer to increase the voltage to the desired voltage to operate the equipment.

As an added advantage, if the enhanced fixtures 121 run off the building's emergency circuit, the fixture 121 will continue to provide outbound power to the ancillary device 190 so that it will continue to run during a power outage. This would be particular good for camera systems tied to a DVR that has a UPS on it, i.e. so that the video-based security system continues to record even during a failure. The fixtures 121 on that circuit typically are in high risk/impact places in the building.

Figure 8:
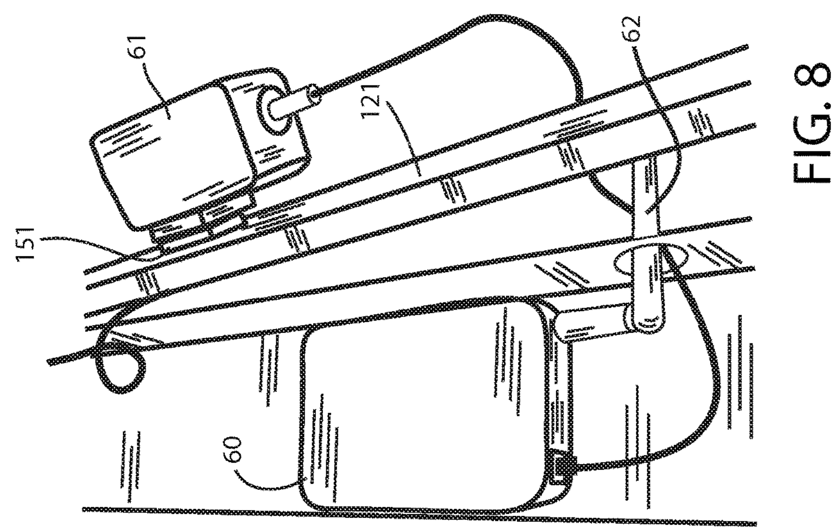
FIGS. 7 and 8 are photographs of a prototype of an enhanced fixture 121 that is providing convenient power to a wireless access point 60 that, in this case, is housed inside of the fixture 121.
Figure 7:
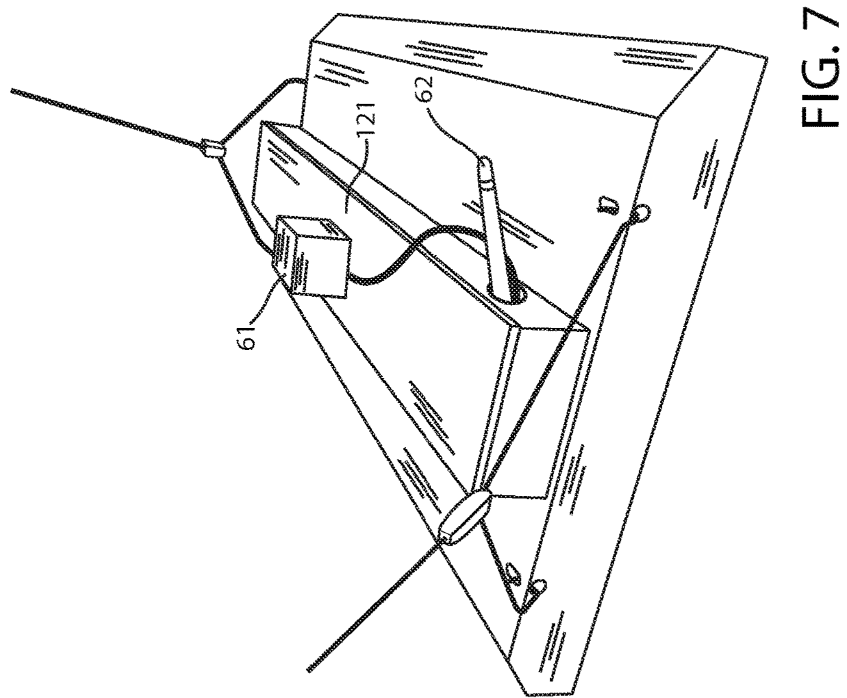

FIGS. 7 and 8 are photographs of a prototype of an enhanced fixture 121 that is providing convenient power to a wireless access point 60 that, in this case, is housed inside of the fixture 121. The device's power adapter 61 is located on the outside of the fixture and is plugged into the enhanced fixture 121's convenience outlet 151. The device 60 has an antenna 61 that, in this particular case, is conveniently extending from a standard "knockout" aperture on the side of the fixture 121 for wirelessly communicating with nearby clients. The device 60 and/or its adapter 61 may be located inside or outside of the fixture as desired or permitted by applicable codes.

I believe that this concept is completely unique, and have never seen anything like it in the lighting industry.

The invention claimed is:

1. An enhanced array of light fixtures for providing both light and a desired non-light feature within an illuminated area of a structure, comprising:

- a first plurality of light fixtures that are adapted for emitting light;
- a reduced plurality of enhanced light fixtures comprised of a subset of the first plurality of light fixtures which are adapted for emitting light and also for supporting a corresponding plurality of auxiliary non-light-emitting devices that require a different voltage and are adapted for providing a desired non-light feature within the illuminated area of the structure;
- a grid of wires connected to each of the light fixtures in the first plurality of light fixtures, said grid of wires providing commercially available power having a first line voltage to each of the light fixtures;
- the first plurality light fixtures comprised of a light emitting system that is connected to and receives the commercially available power having the first line voltage, the light emitting system thereby emitting light to provide light within the illuminated area of the structure; and
- the second plurality of light fixtures each comprised of a power conversion unit that is also connected to and receives the commercially available power having the first line voltage, the power conversion unit converting the first line voltage to a second lower voltage and providing it to the non-light-emitting devices supported by the light fixture.

2. The enhanced array of light fixtures of claim 1 wherein the first line voltage is 277 volts and the second lower voltage is 120 volts.

3. The enhanced array of light fixtures of claim 1 wherein the non-light-emitting devices are comprised of a camera.

4. The enhanced array of light fixtures of claim 1 wherein the non-light-emitting devices are comprised of a WiFi access point.

5. The enhanced array of light fixtures of claim 1 wherein the non-light-emitting devices are comprised of a RFID transponder.

* * * * *